United States Patent [19]
Chevalier

[11] Patent Number: 5,253,131
[45] Date of Patent: Oct. 12, 1993

[54] SERVO PATTERN FOR LOCATION AND POSITIONING OF INFORMATION ON A DISK DRIVE

[75] Inventor: David Chevalier, Santa Clara, Calif.
[73] Assignee: Maxtor Corporation, San Jose, Calif.
[21] Appl. No.: 489,481
[22] Filed: Mar. 6, 1990
[51] Int. Cl.$^5$ ............... G11B 27/32; G11B 27/30
[52] U.S. Cl. .................. 360/78.14; 360/49; 360/72.2; 360/77.05; 369/43; 369/44.26
[58] Field of Search .................. 360/49, 72.2, 77.05, 360/77.07–77.11, 78.14, 135; 369/43, 44.26, 48, 50, 275.3; 358/342; 364/561

[56] References Cited

U.S. PATENT DOCUMENTS

4,604,725  8/1986  Davies et al. .................. 360/72.2
4,918,677  4/1990  Ashinuma et al. .................. 360/78.14

Primary Examiner—Jerry Smith
Assistant Examiner—Steven R. Garland
Attorney, Agent, or Firm—Hecker & Harriman

[57] ABSTRACT

A servo pattern which provides for reference clock synchronization, track following and track crossing, and radial and angular head position information, is described. On each servo track, no two locations have the same pattern, and on each servo track, the pattern read is different from the pattern read on any other servo track. Off-track error signals are derived from the relative read signal amplitudes of adjacent track patterns and reference clock synchronization is derived from the timing of the pulses read. During drive operation, the pattern read from a servo track is compared to an identical pattern generated electronically. Radial and angular position can then be known with certainty when the two patterns match within predetermined bounds. The present invention allows all pulses in the pattern to be used for reference clock synchronization, track following and seeking, and radial and angular position acquisition.

5 Claims, 9 Drawing Sheets

"UNMODULATED" SERVO PATTERNS – FOR _RELATIVE_ POSITION SENSING

FIG. 3

PRIOR ART

"MODULATED" SERVO PATTERNS – FOR _ABSOLUTE_ POSITION SENSING

FIG. 4

PULSE – NO PULSE MODULATION

DIRECTION OF ROTATION

SERVO PATTERN FOR LOCATION AND POSITIONING OF INFORMATION ON A DISK DRIVE

BACKGROUND OF THE PRESENT INVENTION

1. Field of the Invention

This invention relates to the field of mass storage devices.

2. BACKGROUND ART

Information is written on data storage disks in concentric tracks which are accessed by read/write heads. To accurately access the data tracks, servo information is also written onto storage disks, and provides positioning information for the read/write heads. The servo information is also ordinarily written in concentric tracks. In a multiple disk storage environment, one entire surface of a storage disk may be dedicated to servo information. A servo head accesses the servo surface or the servo disk to read the position information stored thereon. Since the servo head is in a fixed relationship relative to the read/write heads, the position of the servo head can be used to indicate the position of the read/write heads. An alternative to a dedicated surface for servo information is a "sector" servo pattern. In a sector servo scheme, pie-shaped wedges of servo information are interweaved between sections of data information.

The servo information permits the definition of the individual data tracks on the data surfaces of the disk drive. The data tracks may be further divided into a plurality of smaller fields, or "sectors". Because storage disks are used as random access memory in many applications, such as personal computers, related information may not always be written in consecutive fashion in the individual tracks. In addition, as old data is removed and new data added, it is not always possible to write new data in adjacent sectors or even adjacent tracks. Therefore, it is important for the disk drive to be able to quickly and accurately access individual tacks and individual sectors of the track.

One method of providing accurate sector positioning uses a counter which continuously monitors sector position once an initial validation has been achieved. In this scheme, the counter is reset once per revolution at a predefined "index" point on each servo track, and is incremented as the track rotates under the servo head. At constant intervals, the counter generates "sector marks" which fix the beginning of individual data sectors. Independently of the sector counter, another counter is used to continuously monitor track position. This "track counter" is bidirectional. It is reset at a predefined "track zero" position of the servo head and is incremented or decremented as the head crosses individual servo tracks while seeking.

The sector counter together with the track counter provides a method for accurately identifying locations on the servo surface. If, however, because of system noise or other perturbation the sector count or the track count become corrupted, subsequent locations will be incorrectly identified until the corresponding validation point causes the corrupted counter to be resynchronized. For this reason, this method of "relative position sensing" is considered to be unreliable when used without an independent method of location verification.

One method for independently verifying the location is to precede each data sector on each data track with a "header" field which contains identifier ("ID") information which is unique to that sector over the entire drive. A typical identifier includes the track number, sector number, and for a drive with multiple data heads, the head number. The header may also contain other information related to media defects and redundancy information for error detection. During operations for reading or writing data, the controller reads the header of each data sector as it is encountered and applies various tests to the information contained therein, including comparison of the ID which was read to the ID which was expected. If the various tests are passed and the ID read matches the ID expected, then the subsequent data part of the sector is read or written appropriately. Because each sector is uniquely and independently identified, then the incorrect identification of any sector will not affect the correct identification of any subsequent sector. Thus, this method of location verification is considered to be reliable and is well-known in the prior art.

However, this method has at least three disadvantages:

1. The headers occupy media space which might otherwise be used for data, consequently both storage efficiency and channel efficiency are degraded;

2. The necessity to read a header before reading or writing its associated data usually requires an "inter-sector gap" (ISG) before each header to allow the write current of the selected data head to decay after writing the previous sector;

3. The means to read and evaluate the header information, together with the means to detect the various modes of failure and the associated means of failure recovery, are complex.

Consequently, a method is desired which does not have these disadvantages but which does provide sufficient information for reliable and accurate location verification.

In the past, the pulses of servo patterns have been distributed into a number of different fields which perform different functions. Thus, prior art servo patterns may include a field to provide information for reference clock synchronization, a field for track folliwing and track crossing information, and a field for position information. However, the division of servo patterns into fields of distinct functionality severely limits the ability to provide precise position information. It is, therefore, desirable to provide a servo pattern in which all of the pulses perform all of the functions of prior art servo patterns, thereby providing relatively more pulses which may be used for position information.

To achieve high data transfer rates with low cost disk drives, system architectures have been developed which use parallel data transfer on multiple serial data channels. In a typical system of this type, a multiplicity of disk drives, each with a single data channel, are attached to a central controller which commands the disk drives in a parallel manner. In operation, the controller divides the transfer of a data entity among the multiple data channels in order to decrease the total transfer time. The decrease in the transfer time, then, results in a beneficial increase in the effective transfer rate.

However, modern operating systems frequently require that a data entity be written and read as a series of individual fragments of a fixed size. These fragments are usually called "blocks". When a controller divides blocks among the multiple disk drives, and headers and ISG's are used on each disk drive as described above, then storage and channel efficiency are degraded still further. This is because each drive has its own associated header and ISG for a data entity. The percentage of space for a fixed data entity used for these headers is greater in a parallel drive scheme. Thus, it is especially desirable to remove headers and ISG's from the data tracks of disk drives in systems using parallel transfer methods.

SUMMARY OF THE PRESENT INVENTION

A servo pattern which provides for reference clock synchronization, track following and track crossing information, and radial and angular position information, is described. In the present invention, sequences of binary digits (bits) are written as patterns of magnetic transition pairs (pulses) on individual servo tracks. On each servo track, no two locations have the same binary sequence, and on each servo track, the binary sequence, when combined with the binary sequences of the two adjacent tracks, is different from the combined binary sequences associated with any other servo track. During drive operation, the binary pattern read from the disk is compared to an identical pattern generated electronically. Radial and angular position can then be known with certainty when the two patterns match within predetermined bounds.

In operation, the individual servo track patterns are the width of two data tracks and are radially spaced by one data track. Adjacent servo tracks are circumferentially staggered by one servo bit time. Off-track error signals are derived from the relative read signal amplitudes of adjacent track patterns and reference clock synchronization is derived from the timing of the servo pulses. Further, track crossing indicators for seeking are derived easily from the pattern. The present invention allows all pulses in the pattern to be used for reference clock synchronization, track following and track crossing, and radial and angular position acquisition.

DETAILED DESCRIPTION OF THE PRESENT INVENTION

A servo pattern which provides for reference clock synchronization, track following and track crossing, and radial and angular head position information, is described. In the following description, numerous specific details are set forth to provide a more thorough description of the present invention. It will be apparent, however, to one skilled in the art, that the present invention may be practiced without these specific details. In other instances, well-known features have not been described in detail so as not to obscure the present invention.

By eliminating headers for data sectors, the present invention increases the disk area available for data recording. This increases the efficiency of the disk drive performance. In typical disk drive systems, a five to ten percent increase can be achieved in space savings alone, with additional performance gains resulting from the faster average transfer rate. In parallel transfer systems, even greater performance gains can be achieved because of the smaller sector sizes that such systems typically use.

The present invention proposes removing the sector ID's from the data surfaces and putting the equivalent position information on a dedicated servo surface. As opposed to the discrete ID fields of prior art, the present invention provides that the position information be continuously available. This allows user customization and changing of sector boundaries without a loss in sector ID capabilities.

Individual prior art ID's provide absolute position information to the disk controller. Relative position information is available even without header ID's. That is, by synchronizing with the rotational index and the track zero position, and then providing counts of sector marks and track crossings, accurate position information can be maintained. However, this scheme lacks reliability. Therefore, it is desirable to provide both relative and absolute position information without the need for individual ID fields on data surfaces.

In the preferred embodiment of the present invention, a servo pattern generated by linear feedback shift registers (LFSR's), is formed on a dedicated servo surface. On any individual servo track, a "window" is defined for viewing the servo pattern and the pattern is such that the pattern in the fixed size window is unique anywhere on the servo surface. Therefore, unique locations may be defined for all servo positions radially and angularly.

SYSTEM OVERVIEW

Figure 1:
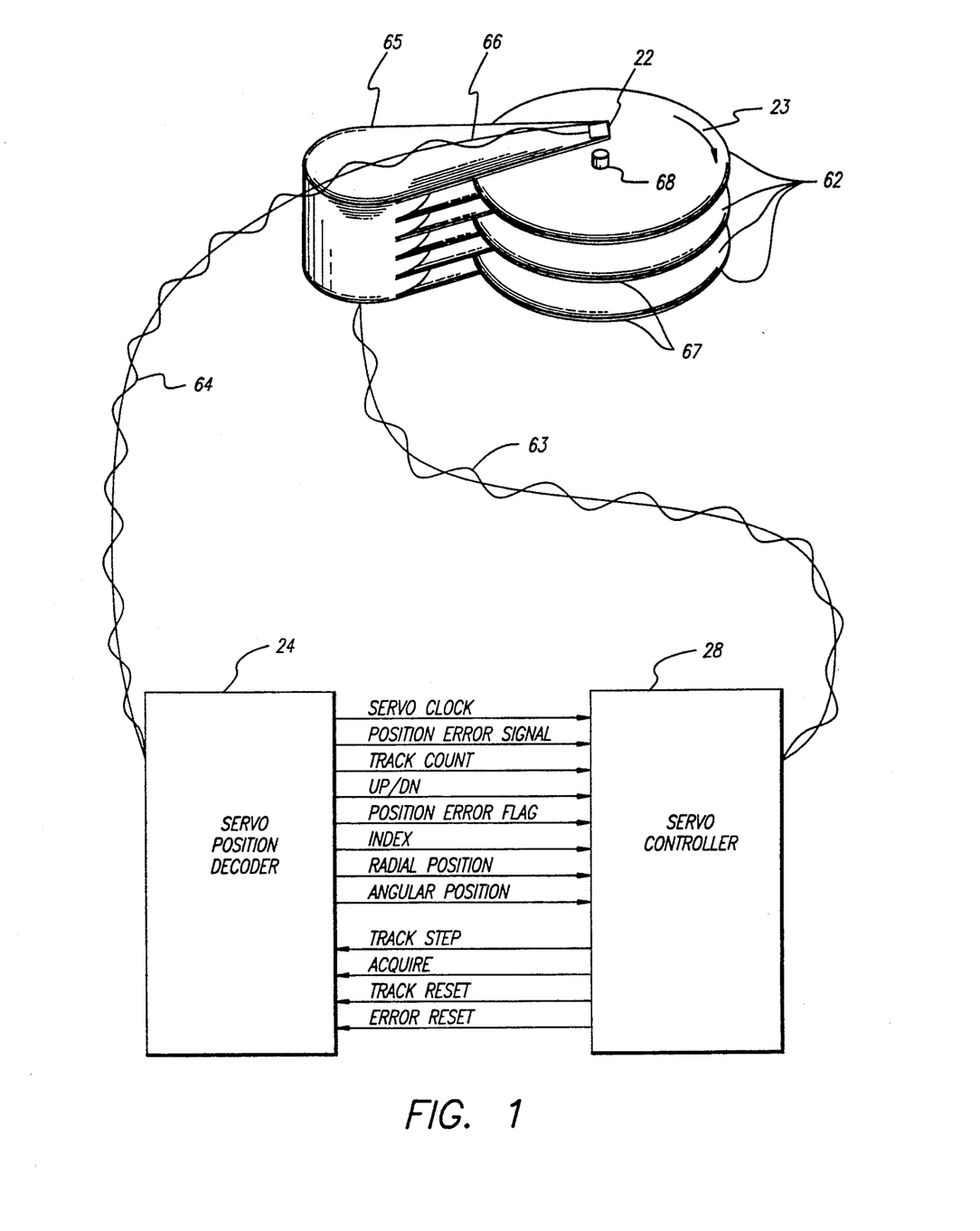
FIG. 1 is a block diagram of a disk drive servo system.

FIG. 1 is a block diagram illustrating a disk drive servo system such as may be used with the present invention. A plurality of disks 67 are arranged in a concentric "stack" on a rotating spindle 68. Information is written on the disks in concentric tracks which are accessed by read/write heads 22. To accurately access the data tracks, servo information is also written onto the storage disks and provides positioning information. In a multi disk storage unit such as illustrated in FIG. 1, one surface such as servo surface 23 of a disk is dedicated to servo information. A servo head accesses this servo surface 23 to read the position information stored on the surface. The servo head 22, along with a plurality of read/write heads accessing the surfaces 62 of the other disks in the stack, are disposed at the end of actuator arms 66 which are part of an actuator assembly 65. The actuator assembly includes an actuator motor. The heads can be rotated radially with respect to the disks and moved from track to track by rotation of the actuator motor. Because the servo head 22 is in a fixed relationship with the data heads, the position of the servo head can be used to indicate the position of the read/write heads.

The servo head 22 detects servo information from the servo surface 23 and provides a servo read signal 64 to a servo position decoder 24. The servo position decoder 24 decodes the servo information to determine which servo track is currently being accessed by the servo head 22. This position information is provided to a servo controller 28. The servo controller 28 provides a control signal 63 to the actuator motor to move the servo head from track to track or to center the servo head over a particular track.

The servo position decoder 24 provides servo clock signal 27, position error signal 29 and track count signal 70 to the servo controller 28. The track count signal 70 counts track crossings and up-down signal 71, also provided to the servo controller, indicates direction of track crossing. The servo position decoder 24 also provides position error flag 76, index 94, radial position 31 and angular position 32 (track number and frame number respectively) to the servo controller 28. In addition, the servo controller 28 provides track step signal 72, acquire signal 73, track reset signal 74 and error reset 75 to the servo position decoder 24.

SERVO PATTERN

The servo system of the present invention utilizes a servo pattern which provides absolute angular and radial position, reference clock sync, and track following information. The servo pattern of the present invention is implemented with circuitry comprising linear feedback shift registers. Each servo track consists of one of a plurality of unique bit sequences. Each three adjacent servo tracks are a unique combination of the plurality of bit sequences. Each servo pattern is generated utilizing a linear feedback shift register.

To write the servo pattern, the parallel output of a shift register is provided to a parity tree to create a linear feedback shift register (LFSR). The output of the parity tree is coupled to a servo/write head and in a feedback loop to the shift register itself. Taps on the shift register determine the sequence of the output. The LSFR is such that if a "window" the length of the shift register is moved incrementally over the sequence, the window will not repeat a value in the sequence generated by the shift register. That is, if the shift register is "N" bits wide, the pattern produced is such that no set of "N" adjacent bits is identical to any other set of N adjacent bits in the generated sequence. If a 4-bit shift register is utilized, a 15-bit pseudo random sequence is yielded before repetition. A 6-bit shift register yields a 63-bit sequence and a 12-bit shift register yields a 4,095-sequence before repeating, etc. Therefore, the viewing window of the servo read circuitry is determined by the length of the shift register used to write the servo pattern.

Figure 8:
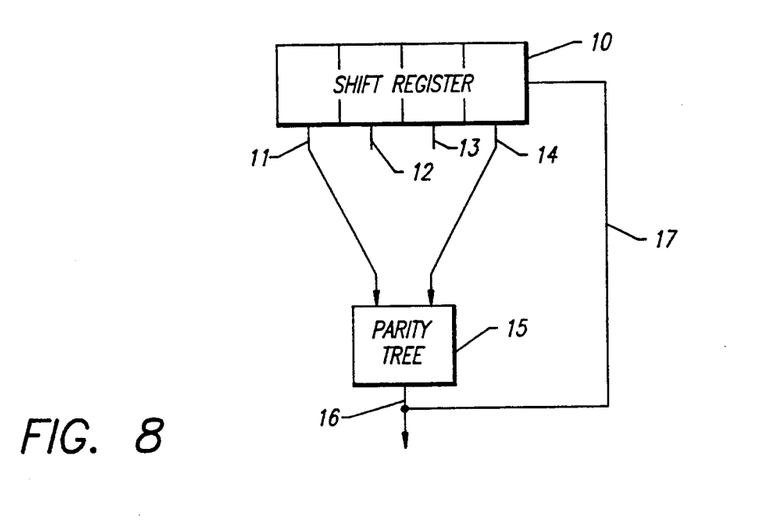
FIG. 8 is a block diagram of an implementation of a linear feedback shift register.

A LFSR such as may be used with the present invention is illustrated in FIG. 8. A shift register 10 has a plurality of taps 11-14 which may be coupled to a parity tree (exclusive OR gates) 15. The output 16 of the parity tree is coupled to a read/write head to write the pseudo random servo sequence. A feedback loop 17 is coupled from the parity tree output to the shift register 10. Depending on which taps are selected of the shift register 10, a different sequence is produced. In the example shown, a 1001 tap command code is utilized so that taps 11 and 14 are "on" and taps 12 and 13 are "off." This produces the following 15 sequence:

111010110010001

This 15-bit sequence then repeats. As noted previously, the larger the shift register, the longer the sequence before repetition.

In the preferred embodiment of the present invention, 12-bit shift registers are utilized to produce 4095 bit pseudo-random sequences. However, other sized sequences having other numbers of bits may be utilized without departing from the scope of the present invention. To write the servo tracks for an entire disk surface, fourteen different LSFR's each with a unique tap selection pattern are used. The sequence of the LSFR's is varied so that no three adjacent servo tracks have the same patterns as any other three adjacent servo tracks. Thus, 2184 servo tracks can be defined.

SERVO READ CIRCUIT

Figure 9:
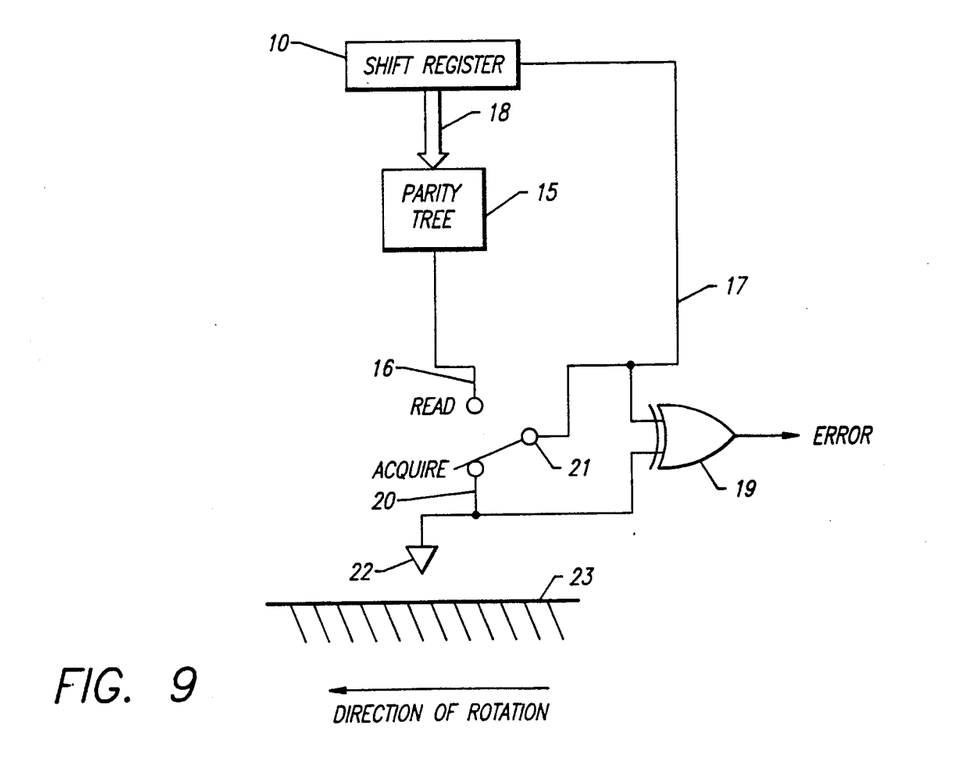
FIG. 9 is a block diagram of servo synchronization circuitry.

A read circuit for use with the servo pattern of the present invention is illustrated in FIG. 9. The read circuit utilizes a linear feedback shift register comprised of a shift register and parity tree as shown in FIG. 8. The shift register must be the same size and have the same tap pattern as was used to write the servo pattern of the disk drive under consideration. If the read LFSR does not match the LFSR used to write the pattern, errors will result. A shift register 10 provides an output 18 to parity tree 15. The output 16 of parity tree 15 is coupled to one terminal of switch 21. The other terminal of switch 21 is coupled to servo head 22. The servo head 22 accesses the surface of a storage disk 23 to read the servo pattern formed thereon. Switch 21 is coupled through feedback line 17 to shift register 10 and to exclusive OR gate 19. The output of exclusive OR gate 19 is error signal 46.

Initially, the switch 21 is coupled to line 20 to acquire the servo pattern and synchronize the shift register with the servo sequence. The pattern on the disk surface is read into the shift register 10 until the shift register is filled. Thereafter, the switch 21 is coupled to output 16 of parity tree 15. The shift register has the same number of taps and the same tap command code as the shift register originally used to write the servo sequence. Thus, the output 16 of the parity tree 15 should be identical to the pattern read from the servo disk surface.

The output error signal 46 of exclusive OR gate 19 represents the degree of synchronization between the parity tree output and the servo sequence. When there is no difference between the shift register output and the servo pattern, a string of zeros will be produced by the exclusive OR gate 19. A "window" is defined having a fixed number of bits of the output error signal 46. If a threshold number of bits have a value of "1" in this error window, it is assumed that a media defect has corrupted a portion of the servo pattern and this corruption is ignored. In the preferred embodiment of the present invention, if 2 or fewer bits in a detect window have a value of 1, synchronization is assumed and the errors are ignored.

If this threshold value is exceeded and the shift register is out of sync with the servo pattern, a persistent string of 1's and 0's will be produced by the exclusive OR gate 19. This string of 1's and 0's indicates a synchronization error and resynchronization is required.

An array of LSFR read circuits such as shown in FIG. 9 are utilized in the absolute position decoder of this invention.

POSITION DECODER

Figure 2:
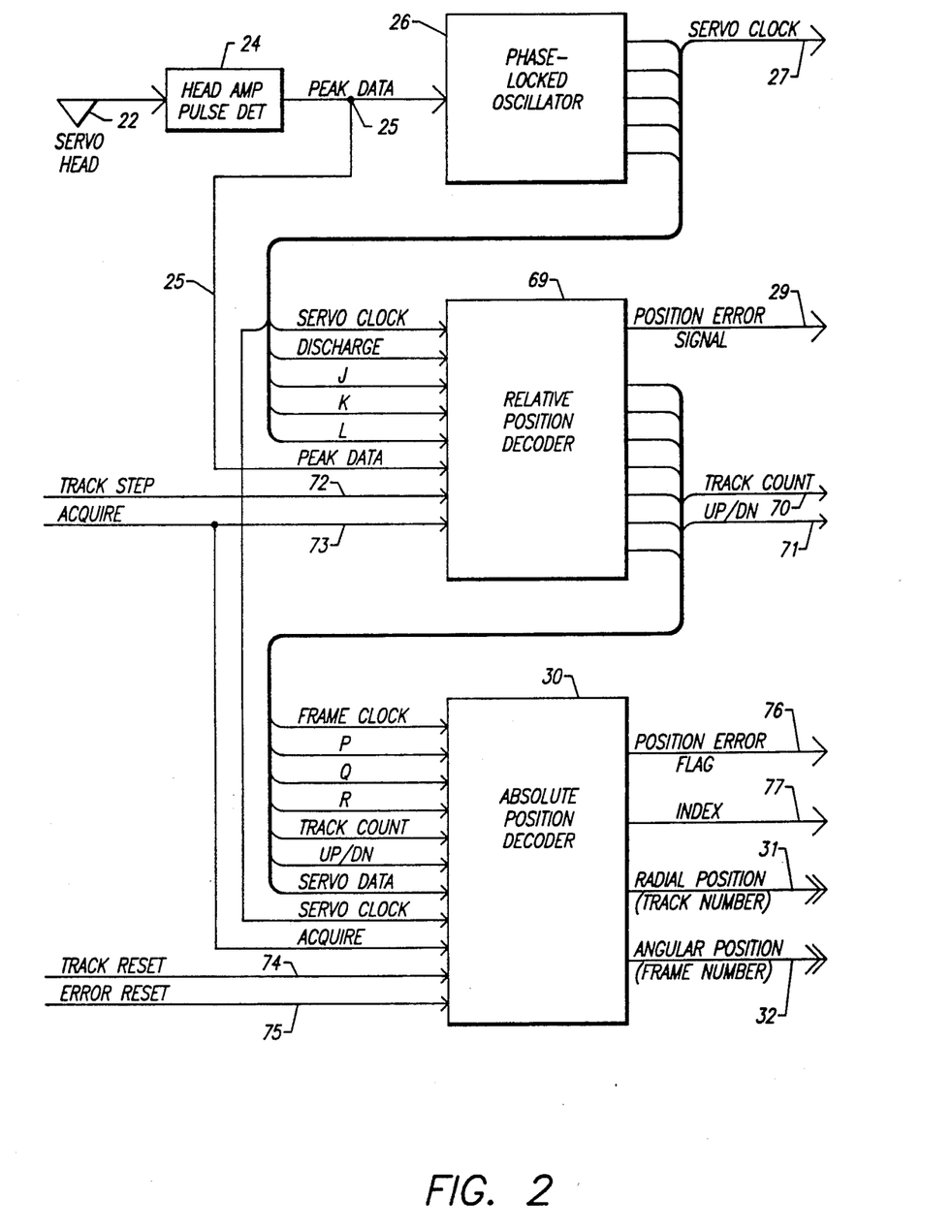
FIG. 2 is a block diagram of a servo position decoder.

The servo position decoder 28 is shown in detail in FIG. 2. A servo head 22 is coupled to a pulse detector 24. The pulse detector 24 provides servo peak data output 25 to a phase lock oscillator 26 and to relative position decoder 69. The phase lock oscillator 26 provides a servo clock signal 27 to the relative position decoder 69. The relative position decoder 69 also receives as input track step 72 and an acquire signal 73. The relative position decoder 69 provides a position error signal 29, a track count signal 70 and up/down signal 71 to the servo controller 28 (FIG. 1). The output of relative position decoder 69 is also coupled to absolute position decoder 30. The absolute position decoder 30 also receives as input track reset signal 74 and error reset signal 75. The absolute position decoder 30 provides as output a position error flag 76, an index signal 77 and radial position signal 31 and angular position signal 32. The radial position signal 31 indicates track number and the angular position signal 32 represents frame or sector number within the particular track being accessed. The index 77 is a "start/stop" point on each track.

The acquire signal 73 is used to synchronize the relative position decoder 69. The J, K and L signals provided to relative position decoder 69 are synchronizing signals used to establish an initial signal level synchronization. As the head moves across tracks, J, K and L are constant around the circumference regardless of the particular track being accessed. P, Q and R signals are signals representing the pulses on the three channels accessed by the servo head. The servo head receives signals from three adjacent servo tracks at a time. The P signal corresponds to the outer diameter servo track, the Q signal corresponds to the pulses of the middle servo track and the R signal corresponds to the pulses of the inner diameter servo track.

The servo pattern of the present invention is such that all required servo information can be obtained from the pattern without the requirement of separate "fields" of servo information. For example, by providing peak data signal 25 to a phase lock oscillator 26, the servo clock 27 can be obtained. The relative position decoder 69 provides a position error signal 29 which can be used for track following as well as a track count signal 70 and an up/down signal 71 for providing directional information. The absolute position decoder 30 provides absolute radial position (actual track number) and angular position signal 32 (the frame number on a track) as well as index information 77.

RELATIVE POSITION DECODER

Figure 5:
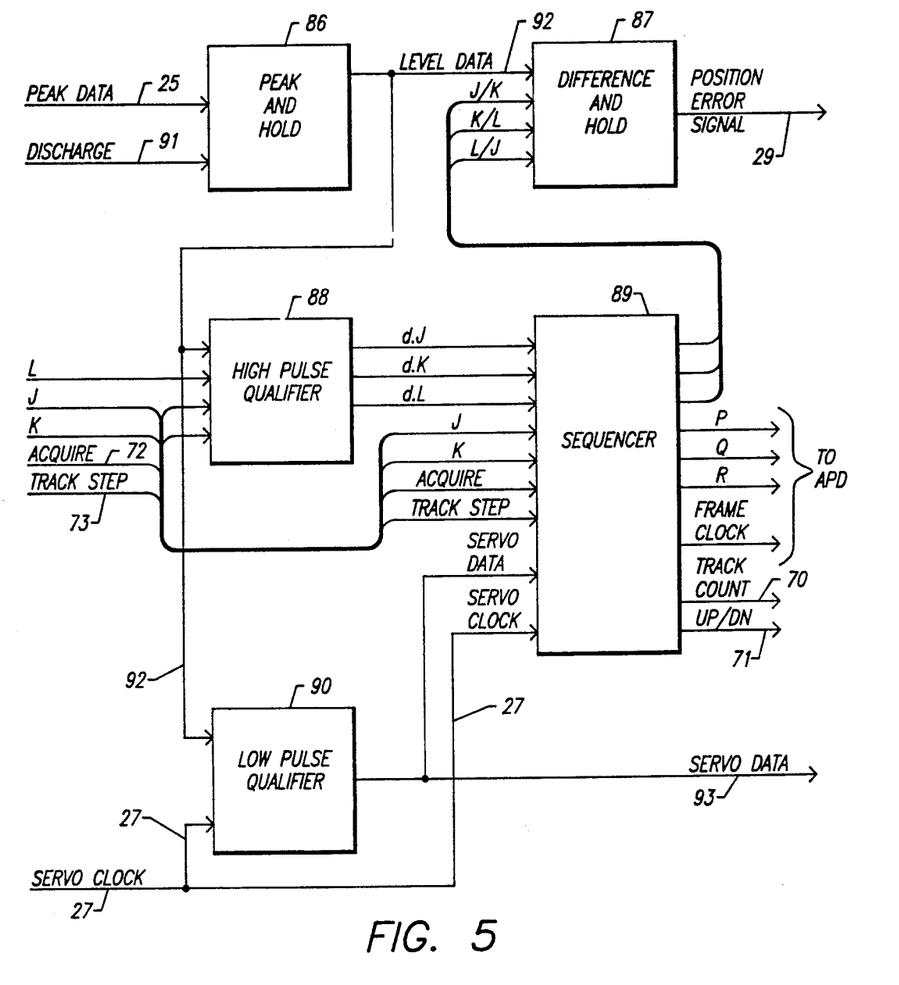
FIG. 5 is a block diagram illustrating a relative position decoder.

The relative position decoder is shown in detail in FIG. 5. The peak data signal from the head pulse detect circuit 24 is provided as input to a peak and hold circuit 86 along with a discharge signal 91 from the phase lock oscillator 26 of FIG. 2. The peak and hold circuit 86 provides a level data output 92 to a difference and hold block 87, high pulse qualifier 88 and low pulse qualifier 90. Inputs L, J and K are received from the phase lock oscillator 26 and provided to the high pulse qualifier 88.

The high pulse qualifier 88 provides outputs $d_J$, $d_K$ and $d_L$ to sequencer 89. $d_J$, $d_K$ and $d_L$ represent the data information on the J, K and L signals. Inputs J and K are also provided to sequencer 89 along with acquire signal 73 and track step signal 72.

Servo clock 27 is provided as an input to low pulse qualifier 90. Low pulse qualifier 90 provides a servo data output 93. The servo data output is also coupled to sequencer 89, along with servo clock 27. Sequencer 89 provides J/K, K/L and L/J output signals to difference and hold block 87. Difference and hold block 87 provides a position error signal output 29. The sequencer 89 provides signals P, Q, R and frame clock to the absolute position decoder. It provides the track count signal 70 and up/down signal 71.

Each track is identified by its sequence index number, also referred to as its polynomial index. The sequence index identifies the tap pattern on the LFSR used to generate that particular track. If there are 14 different tap patterns, then there are 14 different sequence index nubmers. The present invention is such that no two sets of three adjacent servo tracks have the same combination of sequence index numbers. This allows radial position sensing to be accomplished utilizing the servo pattern of the present invention.

The order of the sequence index numbers is stored in the sequencer 89. The sequencer 89 may be a look-up table such as a ROM or a mathematical pattern generator which provides the correct sequence of index numbers. Any suitable method of generating the correct sequence of index numbers may be utilized as sequencer 89 without departing from the scope of the present invention.

Figure 11:
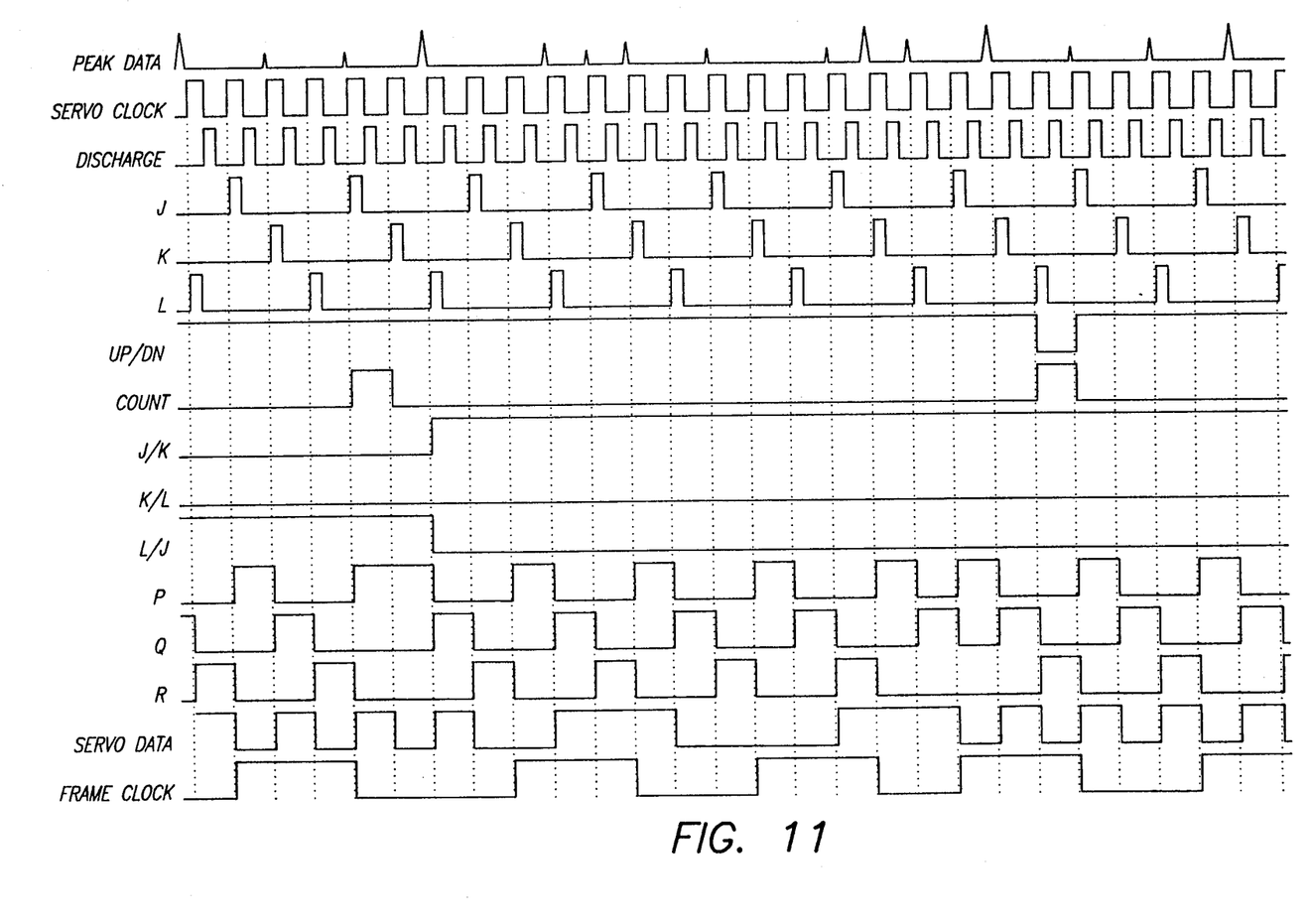
FIG. 11 is a timing diagram illustrating relative position decoding timing.

The J, K and L signals are three phases derived from the servo clock signal. The J, K and L signals are used to identify the three pulse sequences that the servo channel reads at any one time. Referring briefly to FIG. 11, a timing diagram of relative position decoder timing signals is illustrated. The J, K and L signals each pulse every third servo clock and are offset by one clock time. By detecting the occurrence and relative amplitude of the J, K and L signals, a position error signal can be generated and used for center tracking (see FIG. 7). The J/K, K/L and L/J signals are provided to difference and hold block 87. The J/K, K/L and L/J signals are illustrated in FIG. 11. The difference and hold block 87 determines the amplitude difference between the three pairings of the J, K and 6 signals to generate a position error signal.

RELATIVE POSITION DECODER TIMING

The relative position decoder timing is illustrated in FIG. 11. The servo clock is a square wave signal with a rising edge at the beginning of every clock time. The peak data signal 25 and discharge signal 91 (see FIG. 5) are shown in FIG. 11.

The track count signal 70 is illustrated. The track count signal pulses high each time a track is crossed. The up/down signal indicates whether the track number is increasing or decreasing. The PQR signals, frame clock signals, up/down, track count and PES signals are generated from the relative amplitudes of the J, K and L signals. The acquire signal is used in the sequencer 89 (see FIG. 5) as a signal to allow the sequencer to achieve frame synchronization. Once the sequencer achieves frame synchronization, then the acquire signal is no longer needed. The P, Q and R signals are the signals representing the bit sequences of the three adjacent servo tracks being accessed by the servo head at any one time. No consecutive three servo tracks have the same combination of sequence indexes as any other three adjacent servo tracks on a servo disk utilizing this invention.

ABSOLUTE POSITION DECODER

The absolute position decoder 30 of FIG. 2 includes means for providing both radial and angular absolute position information. The absolute position decoder is implemented with an array of linear feedback shift registers and is illustrated in detail in FIG. 10.

The absolute position decoder includes a track counter 81 which receives the P, Q and R signals from the relative position decoder (FIG. 2), the track count signal 70, up/down signal 71 and track reset signal 74. The track counter 81 counts tracks crossed by the servo head and provides a track number output 31. The track counter 81 also provides a select signal to an error decoder 82 and frame counter 83 of the absolute position decoder.

The absolute position decoder includes an LFSR array 80 which receives servo data signal from the relative position decoder 69 of FIG. 2, the acquire signal 73 and in a feedback loop, the index signal 77 and shift clock 79 from the frame counter 83.

Figure 10:
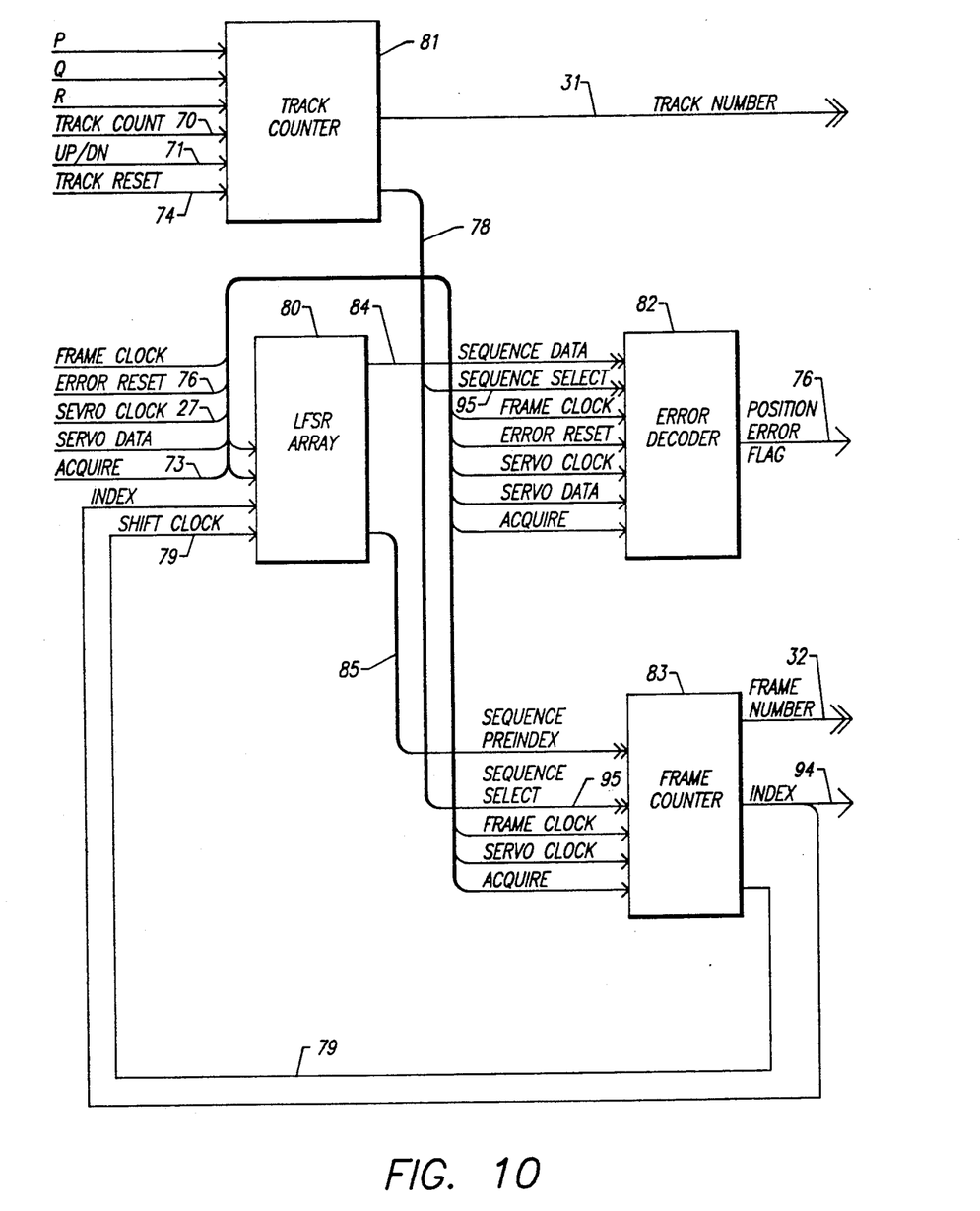
FIG. 10 is a block diagram of an absolute position decoder.

The LFSR array 80 provides a sequence data signal 84 to error decoder 82. The error decoder 82 also receives frame clock, error reset, servo clock, servo data and acquire signals and provides a position error flag output 76. The LFSR array 80 also provides a sequence pre-index output signal 85 to frame counter 83. The frame counter 83 also receives as input the sequence select signal, frame clock, servo clock and acquire signal. The frame counter 83 provides a frame number output 32 for angular position within a track as well as an index indicator 77 when index is encountered. The frame counter also provides a shift clock 79 in a feedback loop to the LFSR array 80.

The servo pattern of the present invention provides absolute angular addressing without the need for ID headers. Further, because the pattern of the present invention provides a continuous ID field, the size and position of sector boundaries may be easily changed and customized without a loss in sector ID capabilities.

In the preferred embodiment of the present invention, there is one linear feedback shift register for each unique pseudo-random servo pattern. In this embodiment, there are 14 patterns, so there are 14 linear feedback shift registers.

The LFSR array 80 is comprised or an array of read circuits as shown in FIG. 2. The servo data is provided to each circuit of the array and sequence data is generated and provided to error decoder 82. At any one time, no more than three of the outputs will indicate a match between the generated pattern and the servo data signal. This is because portions of three tracks at a time are read by the servo head.

The LFSR array 80 receives the servo data signal 93 from the relative position decoder. The LSFR array 80 generates sequence data signal 84 and provides it to the error decoder 82. The track counter generates a sequence select signal 95 and provides it to the error decoder 82 as well. The sequence select signal 95 is a signal which indicates which of the plurality of sequences are to be selected for a particular track. The track counter 81 includes lookup tables matching sequence combinations with track numbers. The LFSR array 80 provides the unmodified sequences (1's and 0's) to the error decoder 82. The error decoder 82 selects the proper sequences according to the sequence select signal and compares the sequences to servo data. The error decoder 82 detects any mismatch and flags the error. The sequence data signal 84 of FIG. 10 is actually all 14 sequence signals from the LFSR array.

The frame counter 83 is a binary counter (12 bits in this implementation) which counts the servo frames using frame clock during the rotation of the servo track under the servo head. During normal operation, the frame counter 83 is reset to zero at the index point of each rotation by one of the sequence pre-index signals from the LFSR array 80, which is selected according to the sequence select signal. There is only one index point in the selected sequence during a single rotation. Thus, the frame number, which is an output of the frame counter, represents absolute angular position.

However, when servo synchronization is being acquired (after spin-up, for example) and before the frame counter 83 can be synchronized, the LFSR array must be synchronized to the servo track in order for the index point to reset the counter to zero at the proper angular location. One method of doing this is simply to wait for one rotation after LFSR synchronization. At least one index point will have passed during one revolution and the frame counter will have been reset at the proper location. This implementation, however, includes a circuit which allows the LFSR array and frame counter to run in a "fast forward" mode, using the servo clock instead of the frame clock. (The shift clock 79 of FIG. 10, then, is identical to either the frame clock or the servo clock 27, depending on the mode of the frame counter.) In this mode, the index point of the selected sequence is passed (resetting the frame counter) in approximately one-fifth of a rotation, thus saving considerable time. The LFSR array and frame counter then return to the slower mode using the frame clock for normal operation.

Figure 13:
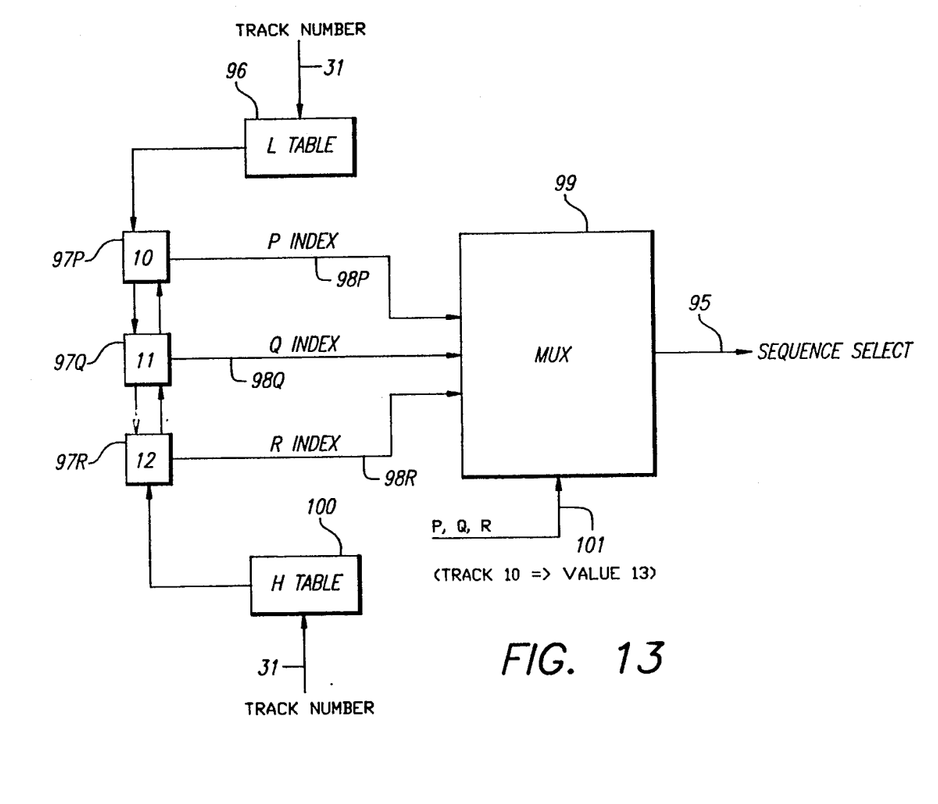
FIG. 13 is a block diagram of circuitry used to generate the sequence select signal.

A block diagram of circuitry for generating a sequence select signal is illustrated in FIG. 13. The signal track number 31 is coupled to the inputs of two lookup tables, the C table 96 and H table 100. The output of L table 96 is coupled to register 97P. The output of H table 100 is coupled to register 97R. Register 97Q is coupled to registers 97P and 97R. The registers contain the index numbers of the current servo track (Q) and the adjacent servo tracks (P and R). In the example shown, the current track is track 10. The index number of track 10 is sequence index number 11. Therefore, a value of 11 is stored in register 97Q. The adjacent track in the negative direction (toward the outer diameter of the disk) track 9, has an index of 10, stored in register 97P. The adjacent track in the positive direction is track 11, with a sequence index number 12 stored in register 97R.

The outputs 98P, 98Q and 98R of registers 97P, 97Q and 97R, respectively, are the sequence index numbers of the current servo tracks and are provided to multiplexer 99. The actual P, Q and R signals are provided to MUX 99 on line 101 and are used to select the appropriate index numbers. The output of MUX 99 is the sequence select signal 95.

The values contained in the lookup tables of the track counter represent the order that the discrete servo sequences are formed on the servo surface. Each value indicates a discrete sequence and is used to select one LSFR according to the track and frame timing. Using sequence indexes 1 through 14, the values of the lookup tables may be generated as follows:

1. Enumerate the permutations of the indexes 1 . . . 14, taken three at a time:

(1 2 3), (1 2 4), (1 2 5), (1 2 6), (1 2 7), (1 2 8), (1 2 9), (1 2 10), (1 2 11), (1 2 12)

. . .

. . .

(14 13 3), (14 13 4), (14 13 5), (14 13 6), (14 13 7), (14 13 8), (14 13 9), (14 13 10), (14 13 11), (14 13 12)

There are 2,184 such permutations.

2. Sort the permutations such that:

(a) The second index of the first 14 permutations is the indexes 1 . . . 14, respectively;

(b) The first and second indexes of a permutation match the second and third indexes, respectively, of the previous permutation.

For example, the permutations may be sorted as follows:

```
13 1 2
  1 2 3
    2 3 4
      3 4 5
        4 5 6
          5 6 7
            6 7 8
              7 8 9
                8 9 10
                  9 10 11
                    10 11 12
                      11 12 13
                        12 13 14
                          13 14 12
                            14 12 11
                            .
                            .
                            .
                          4 13 12
                        13 12 1
                      12 1 2
                      1 2 14
                    2 14 13
                  14 13 1
```

3. Map the second index of the sorted permutations onto the track numbers 0 . . . 2183:

| TRACK: | INDEX |
|---|---|
| 0: | 1 |
| 1: | 2 |
| 2: | 3 |
| 3: | 4 |
| 4: | 5 |
| 5: | 6 |
| 6: | 7 |
| 7: | 8 |
| 8: | 9 |
| 9: | 10 |
| 10: | 11 |
| 11: | 12 |
| 12: | 13 |
| 13: | 14 |
| 14: | 12 |
| . | . |
| . | . |
| . | . |
| 2177: | 13 |
| 2178: | 12 |
| 2179: | 1 |
| 2180: | 2 |
| 2181: | 14 |
| 2182: | 13 |
| 2183: | 1 |

By this method of construction, it is true that the indexes of any three successive tracks are different from the indexes of any other three successive tracks.

4. Assuming the decoder architecture in FIG. 13, generate lookup tables L and H. The L Table value is loaded into the P index register when the track crossing is negative; the H value is loaded into the R register when the track crossing is positive.

The resulting look-up tables will have values exemplified as follows:

| TRACK | L VALUE | H VALUE |
|---|---|---|
| . | . | . |
| . | . | . |
| . | . | . |
| 6: | 5 | 9 |
| 7: | 6 | 10 |
| 8: | 7 | 11 |
| 9: | 8 | 12 |
| 10: | 9 | 13 |
| 11: | 10 | 14 |
| 12: | 11 | 12 |
| 13: | 12 | 11 |
| . | . | . |
| . | . | . |
| . | . | . |

Lookup table L loads the registers when track crossings are in the negative direction. The H lookup table loads the registers when track crossings are in the positive direction.

ABSOLUTE POSITION DECODER TIMING

Figure 12:
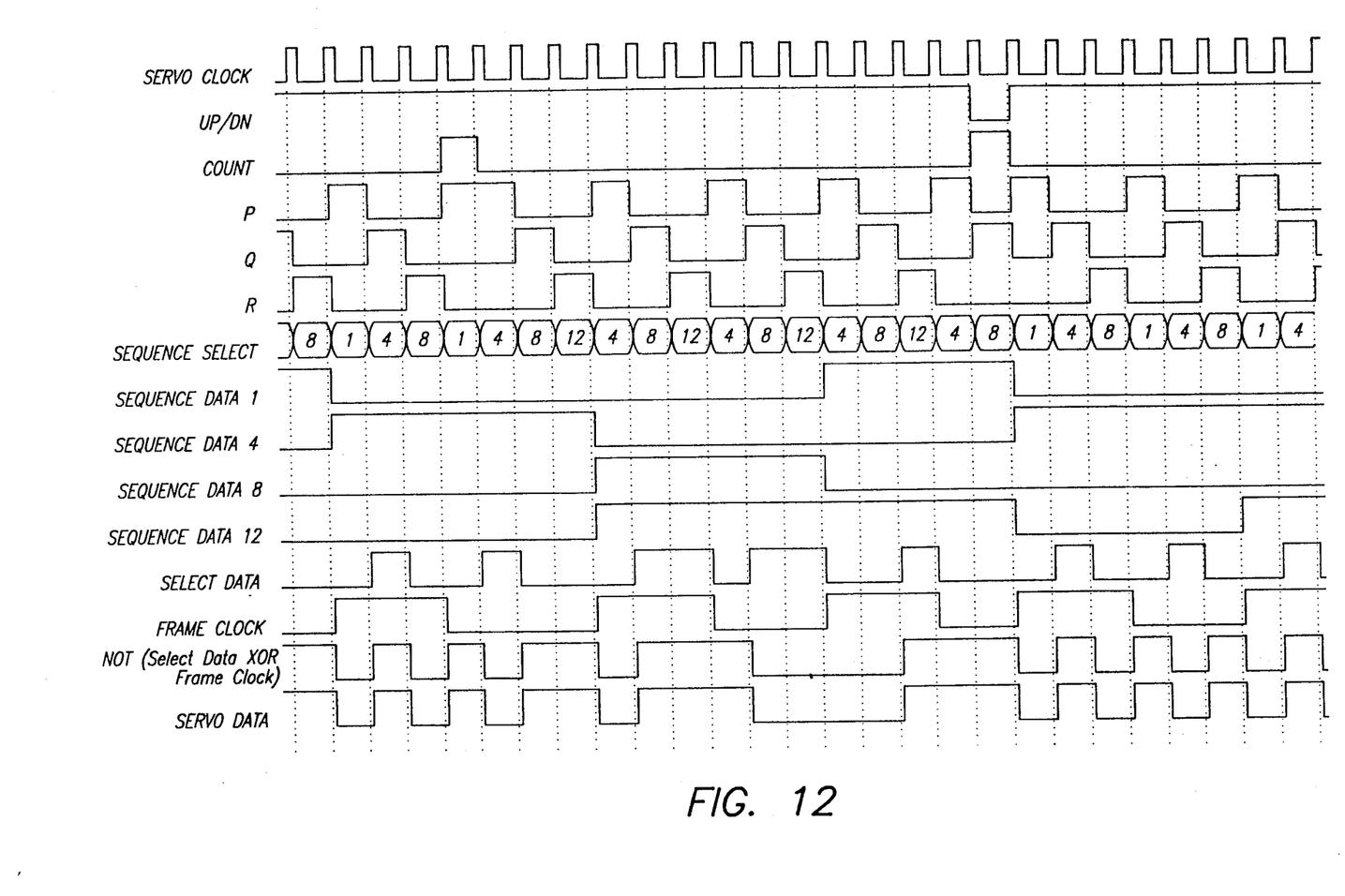
FIG. 12 is a timing diagram illustrating absolute position decoding timing.

FIG. 12 is a timing diagram illustrating absolute position decoder timing. The track counter 81 receives the P, Q and R signals from the servo tracks being accessed as well as the track count signal and up/down signal 70 and 71, respectively. The up/down count shows a count up, followed by a down count and then a return to up count. This can also be seen by referring to the sequence select signal. By way of example, the sequences are numbered from 1 to 14 in the preferred embodiment of the present invention. The current servo head position is over the sequence 1, 4, 8. At the track count pulse, the sequence shifts to 4, 8, 12. At the next track count pulse, which is a down count, the servo head returns to the original track and sequence 1, 4, 8.

Figure 14:
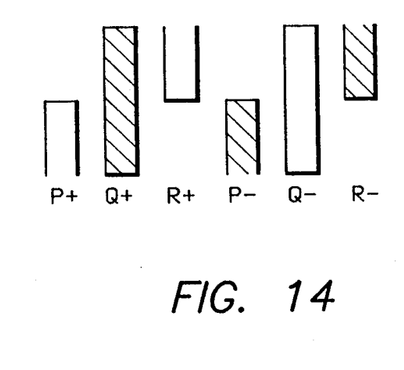
FIG. 14 is a diagram of a frame of the servo pattern of this invention.

Also illustrated in FIG. 12 are examples of sequences, 1, 4, 8 and 12. Each example shows a few bits of the sequence which in the preferred embodiment is 4,095 bits in length. The servo data and frame clock signals are provided by the relative position decoder to the absolute position decoder. Each sequence bit is written into two pulse positions with phase inversion. (See the "Proposed Servo Frame," FIG. 14). Frame clock provides this inversion. Note that NOT (select data XOR frame clock) exactly matches servo data. Hence, there is no error. The absolute position decoder is synchronized to the servo track and the position is known reliably.

POSITION ERROR SIGNAL

Figure 4:
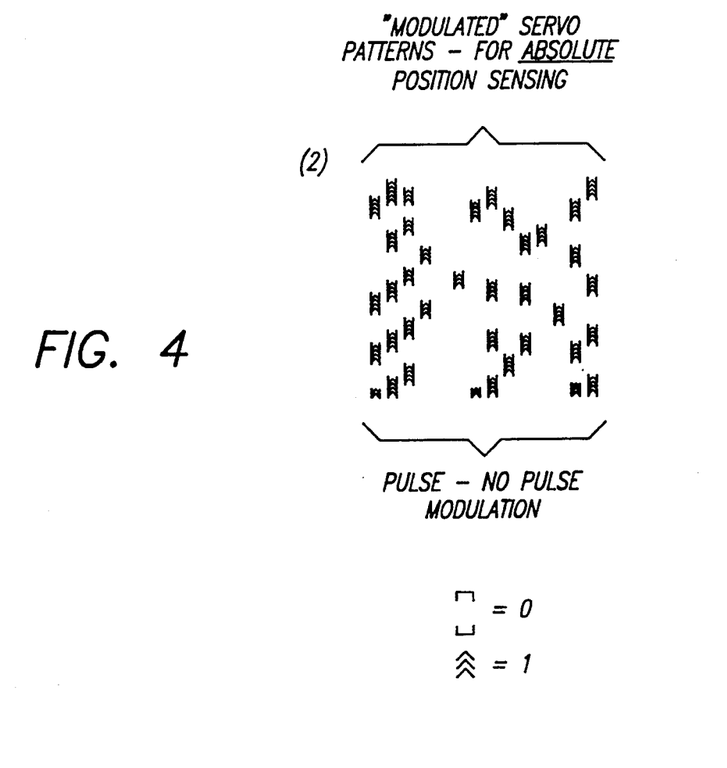
FIG. 4 illustrates one embodiment of a modulated prior art servo pattern for absolute position sensing.

An example of a modulated servo pattern used for absolute position sensing is illustrated in FIG. 4. FIG. 4 illustrates a pulse/no pulse modulation pattern. The absence of a pulse indicates a binary "0" and the presence of a pulse indicates a binary "1".

The pattern of FIG. 4 is suitable for use in absolute position sensing. The greater number of pulses increases the sampling and allows for more accurate control. As noted previously, however, track seeking and track following are independent from absolute position sensing.

Figure 3:
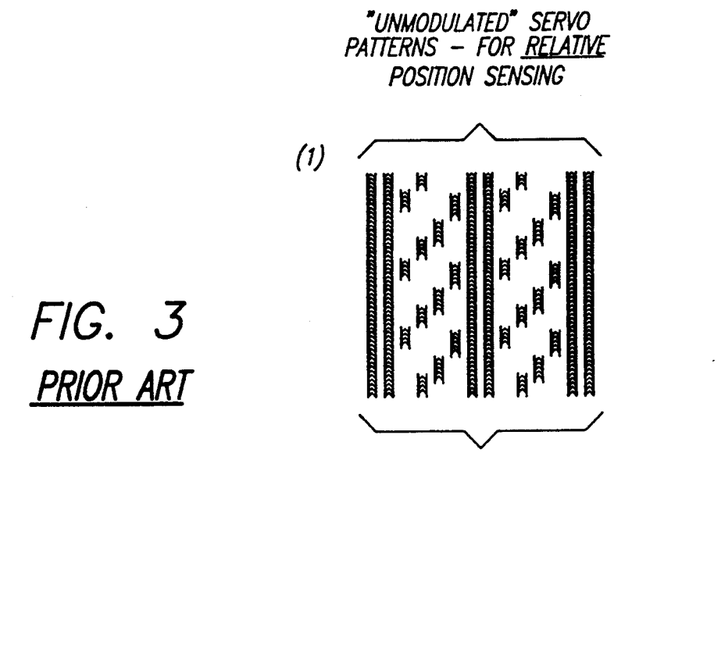
FIG. 3 illustrates an unmodulated prior art servo pattern for relative position sensing.
Figure 6:
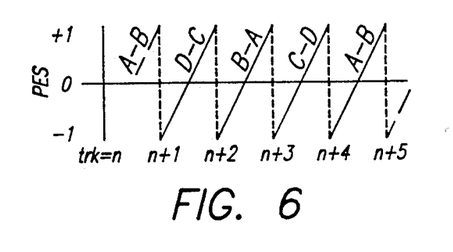
FIG. 6 is a timing diagram illustrating a prior art position error signal.

An unmodulated servo pattern of the prior art is illustrated in FIG. 3. This pattern is utilized for relative position sensing only. FIG. 6 illustrates the position error signal generated by the prior art unmodulated servo pattern of FIG. 3a. As the servo head crosses servo tracks, four error signals are generated, a-b, d-c, b-a and c-d, depending on the relative position of the servo head with respect to the servo tracks. This standard pattern of FIG. 3 assumes that the same quadrature error signal is used for track crossing (seeking) and track following.

Figure 7:
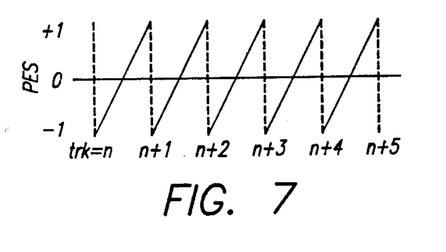
FIG. 7 is a timing diagram illustrating a position error signal of the present invention.

The position error signal of the unmodulated servo pattern of the present invention illustrated in FIG. 4 is shown in FIG. 7. In this case, the staggered di-bit pattern allows true pulse amplitude signals to be used for track following. This yields higher performance during seek operations.

In the preferred embodiment of the present invention, each logical servo track has a different set of three sequences. The servo head actually reads pulses from three track sequences which permits the detection of absolute radial position (track number).

Thus, a servo pattern which eliminates the need for individual ID headers and provides reference clock synchronization, track following and track crossing, and radial and angular position information is described.

I claim:

1. A method of determining radial and angular position of a detection means disposed over a disk having a plurality of data tracks comprising the steps of:

forming a plurality of servo tracks on a surface of said disk, each of said servo tracks comprising one of a plurality of binary sequences such that a first number of consecutive bits of said binary sequence is unique anywhere on a track;

said plurality of servo tracks formed in a pattern on said surface such that a second number of consecutive servo tracks comprise a unique combination of said plurality of binary sequences;

determining angular position of said detection means by sequentially comparing said first number of consecutive bits with a generated stream of bits corresponding to said one of said plurality of binary sequences;

determining radial position of said detection means by sequentially comparing said second number of consecutive tracks with said pattern of servo tracks.

2. The method of claim 1 wherein said first number of consecutive bits comprises 12 consecutive bits.

3. The method of claim 1 wherein said second number of servo tracks comprises 3 servo tracks.

4. The method of claim 1 wherein said plurality of binary sequences comprises 14 binary sequences.

5. The method of claim 1 wherein said step of forming a plurality of servo tracks comprises steps of:

providing a shift register having a number of outputs equal to said first number of consecutive bits;

selecting a tap pattern;

providing output of said shift register to a parity tree;

writing output of said parity tree on said disk surface;

coupling said output of said parity tree in a feedback loop to said shift register.

* * * * *